United States Patent [19]

Lee et al.

[11] Patent Number: 5,510,429
[45] Date of Patent: Apr. 23, 1996

[54] POLYCARBONATE-G-POLYACRYLATE GRAFT COPOLYMERIZATION

[75] Inventors: Sunggyu Lee, Akron; Ronald A. Sobocinski, Seven Hills, both of Ohio

[73] Assignee: The University of Akron, Akron, Ohio

[21] Appl. No.: 279,532

[22] Filed: Jul. 25, 1994

[51] Int. Cl.[6] .................................................. C08F 283/02
[52] U.S. Cl. .............................. 525/468; 525/63; 525/148
[58] Field of Search ............................................. 525/468

[56] References Cited

U.S. PATENT DOCUMENTS

| | | | |
|---|---|---|---|
| 3,462,515 | 8/1969 | Cantrill | 525/468 |
| 3,692,870 | 9/1972 | Schnell | 525/468 |
| 4,005,037 | 1/1977 | Mietzsch et al. | |
| 4,308,185 | 12/1981 | Evans et al. | 525/63 |
| 4,310,642 | 1/1982 | Margotte | 525/468 |
| 4,440,916 | 4/1984 | Waters et al. | 523/307 |
| 4,469,852 | 9/1984 | Tyrell et al. | 525/468 |
| 5,079,302 | 1/1992 | Lee et al. | 525/256 |

FOREIGN PATENT DOCUMENTS

| | | | |
|---|---|---|---|
| 031796 | 3/1978 | Japan | 525/468 |

OTHER PUBLICATIONS

Gora, "Graft Copolymerization onto Polycarbonate Film" *Chem. Zvesti* 31(1); pp. 74–78; 1977.

*Primary Examiner*—David Buttner
*Attorney, Agent, or Firm*—Renner, Kenner, Greive, Bobak, Taylor & Weber

[57] ABSTRACT

A method of grafting alkyl (alkyl) acrylate to a polycarbonate at a carbon atom which both before and after grafting has an $sp^3$ electron configuration, includes the step of contacting a polycarbonate which is in the solid phase with alkyl (alkyl)acrylate monomers in the presence of a suitable free radical initiator at a temperature sufficient to activate the free radical initiator for a time sufficient to attain a desired degree of grafting. The grafting method of the invention allows for the relatively rapid production of polycarbonate-graft-poly-(alkyl(alkyl)acrylate) copolymers using conventional polycarbonate polymers which have not been specially modified to facilitate grafting. The resulting graft copolymer of the process generally has an alkyl (alkyl)acrylate content of from about 1 to about 20 percent by weight with the polycarbonate portion of the graft copolymer having a weight-average molecular weight of from about 5,000 to about 200,000. The graft copolymer product is ideally suited for use as a compatibilizer for forming a miscible polymeric blend between two or more immiscible polymers, or can be used substantially alone as a thermoplastic having enhanced properties characteristic of both polycarbonate and polyacrylates.

8 Claims, No Drawings

5,510,429

POLYCARBONATE-G-POLYACRYLATE GRAFT COPOLYMERIZATION

FIELD OF THE INVENTION

The present invention relates to a process for grafting an alkyl (alkyl)acrylate to a polycarbonate and to the resulting polycarbonate-g-polyacrylate copolymer. More specifically, the invention involves a free radically initiated graft copolymerization process in which an alkyl (alkyl)acrylate is grafted onto polycarbonate, which is in the solid phase, at a carbon atom of the polycarbonate which both before and after grafting has an $sp^3$ electron configuration.

BACKGROUND OF THE INVENTION

Polycarbonate is recognized as an engineering thermoplastic having excellent toughness, clarity, ignition resistance, dimensional stability, good insulation properties and corona resistance, and high impact and creep resistance over a wide temperature range. On account of its excellent overall combination of properties, polycarbonates are utilized in a wide variety of applications such as appliance and power tool housings, automotive headlight and taillight lenses, aircraft parts, airport runway markers, motorcycle helmets and face guards, windshields, and the like. However, with the ever expanding demand for greater impact-efficient products, resin producers have sought to achieve enhanced properties by blending or otherwise incorporating acrylic polymers into polycarbonate resins. In addition to improved impact resistance, incorporation or blending of acrylic polymers, particularly polymethyl methacrylate, with polycarbonate may also be expected to enhance scratch resistance and UV resistance.

U.S. Pat. No. 4,469,852 to Tyrell et al. discloses a composition based on an aromatic polycarbonate in admixture with impact modifying quantities of a modified aromatic polycarbonate to which are grafted polymers of a long chain alkenyl compound. The modified aromatic polycarbonate is modified to include alkenyl substituted aromatic constituents. Alkyl (alkyl)acrylates wherein the ester alkyl portion contains from 3 to 20 carbon atoms are grafted to the alkenyl groups of the modified aromatic polycarbonate at the olefinic unsaturation site thereof. The process of Tyrell et al., therefore, has the inherent disadvantage of requiring the copolymerization of a polycarbonate copolymer formed from specially modified comonomers containing alkenyl substituted aromatic constituents. Accordingly, the process of Tyrell et al. involves the synthesis or procurement of compounds which are not readily available as commodity chemicals. An additional disadvantage is that any unreacted carbon-carbon double bonds in the alkenyl group will lead to polymeric compositions which are sensitive to oxidative and thermal degradation. Moreover, Tyrell et al. teach a free radical graft polymerization process which is conducted entirely in the liquid phase and which involves the use of a solvent such as cyclohexane from which the graft copolymer must normally be separated. Also, because of the higher mass transfer resistances encountered in the liquid phase, the overall or apparent reaction rate for the graft copolymerization process is slower than would be expected from a process wherein the polycarbonate to which the alkyl (alkyl)acrylates are to be grafted is in the solid phase.

Accordingly, a process for producing polycarbonate-graft-poly(alkyl (alkyl)acrylate) copolymers from conventional polycarbonate polymers and/or precursors free of alkenyl groups, and which is conducted by contacting the alkyl (alkyl)acrylates with the polycarbonate being in the solid phase would overcome many of the problems of the prior art. In particular, the absence of carbon-carbon double bonds from the polycarbonate used to produce the polycarbonate-graft-poly(alkyl (alkyl)acrylate) copolymer would tend to provide graft copolymers having greater resistance to thermal and oxidative degradation, and would eliminate the need for synthesizing specially modified polycarbonates. Also, a graft copolymerization which is conducted with the polycarbonate base polymer in the solid phase would eliminate the need for solvents and for separation processes for removing the product copolymer from the solvents, and would result in lower mass transfer resistance and higher overall reaction rates.

SUMMARY OF THE INVENTION

The invention pertains to a process for grafting one or more alkyl (alkyl)acrylate monomers to a polycarbonate. The process involves the step of contacting a polycarbonate, such as poly(carbonyldioxy-1,4-phenyleneisopropylidene-1,4-phenylene), which is in the solid phase, with one or more alkyl (alkyl)acrylate monomers, such as methyl methacrylate, in the presence of a suitable free radical initiator, such as t-butyl peroxybenzoate, at a temperature sufficient to activate the initiator, such as about 130° C. for t-butyl peroxybenzoate, and thereby induce free radical graft copolymerization of the acrylate monomers onto the polycarbonate. In accordance with the preferred mode of practicing the invention, the reactants and reaction conditions are selected such that the carbonate polymer is in particulate form, the alkyl (alkyl)acrylate is predominately in the gaseous state, and the free radical initiator is predominately in the liquid state. The reactants and conditions are thus selected so that the second step of the initiation process, following the homolytic dissociation of the initiator into a pair of radicals, predominately favors abstraction of a hydrogen from an aliphatic substituent of the polycarbonate as opposed to addition of the initiator radical to a monomer, even when the polycarbonate is free of olefinic unsaturation. The foregoing initiation sequence, involving the abstraction of a hydrogen from the polycarbonate, is believed to be favored over addition of the initiator radical to a monomer, even when the polycarbonate is free of olefinic unsaturation, when the process of the invention is utilized, because the liquid phase initiator is in more intimate contact with the solid phase polycarbonate than with the gaseous phase alkyl (alkyl)acrylate. Thus, by increasing interactions between the initiator and polycarbonate, while reducing interactions between the initiator and the alkyl (alkyl)acrylate monomers, as compared to conventional graft polymerization processes conducted exclusively in the liquid phase, it is possible to effectively inhibit competing reactions involving the polymerization of the alkyl (alkyl)acrylate monomers while selectively promoting graft copolymerization. By restricting interactions between the initiator and the alkyl (alkyl)acrylate monomers while promoting interactions between the initiator and the polycarbonate, it is possible to abstract non-allylic hydrogens from polycarbonates which are free of olefinic unsaturation at a rate sufficient to enable a substantial number, or even a majority, of the alkyl (alkyl)acrylate monomers to be incorporated into the graft copolymer as opposed to forming poly(alkyl (alkyl)acrylates), whereas, with the prior art liquid phase copolymerization processes, the interactions between the initiator and the alkyl (alkyl)acrylate monomers occur with such high frequency that abstraction of non-allylic hydrogen is not competitive and does not occur to any appreciable extent, thus effectively limiting the prior art copolymerization processes to polycarbonates which have been specifically modified to contain olefinic unsaturation and/or readily abstractable allylic hydrogens. Accordingly, the invention facilitates the synthesis of polycarbonate-graft-poly(alkyl (alkyl)acrylate) copolymers which are free of olefinic unsaturation and wherein the poly(alkyl (alkyl)acrylate) portion is grafted to the polycarbonate at a carbon atom which has an $sp^3$ electron configuration both before and after the graft copolymerization.

DETAILED DESCRIPTION OF THE PREFERRED EMBODIMENTS

The polycarbonates from which the graft copolymers of the invention can be formed generally include any aliphatic or aromatic polycarbonates known to the art having recurring units of the general formula

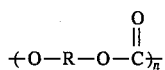

wherein R can generally represent any divalent hydrocarbon grouping including alkylenes, arylenes, alkylarylenes, arylalkylenes, and halogen, alkyl- and alkenyl-substituted alkylenes, arylenes, alkylarylenes and arylalkylenes, as well as polycarbonate copolymers containing two or more of the foregoing substituents, and wherein n and R are selected so that the polycarbonate has a weight average molecular weight of from about 5,000 to about 200,000, and preferably from 20,000 to 100,000. Suitable R-groups include those containing from about 2 to about 30 carbon atoms, with those having from about 4 to about 12 being preferred. Preferred polycarbonates generally include aromatic polycarbonates which are prepared by any of various well-known processes, such as, for example by reacting a dihydric phenol with phosgene or by ester interchange with diphenyl carbonate. Particularly, preferred for its commercial availability and well-known desirable properties is poly(carbonyldioxy-1,4-phenyleneisopropylidene-1,4-phenylene) which is, for example, sold by the General Electric Co. under the "LEXAN" trademark.

Suitable alkyl (alkyl)acrylate monomers for grafting to the polycarbonates generally include compounds having the general formula

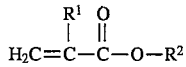

wherein $R^1$ is hydrogen or an alkyl group having from 1 to 6 carbon atoms, and $R^2$ is an alkyl group having from 1 to 6 carbon atoms. Preferred alkyl (alkyl)acrylates include alkyl acrylates, alkyl methacrylates, and alkyl methacrylates of lower molecular weight which can be volatilized at a suitable activation temperature of the chosen free radical initiator. Mixtures of different alkyl (alkyl)acrylate monomers may also be used. Suitable acrylates, for example include ethyl acrylate, propyl acrylate, butyl acrylate, 2-ethylhexyl acrylate and the like. A particularly preferred alkyl (alkyl)acrylate monomer for use with the invention is methyl methacrylate, primarily because of its high rate of reaction in the process, relatively low boiling point, its ability to form hard, scratch resistant polymers and its UV resistance.

Suitable initiators generally include any of the various organic peroxide initiators including acyl peroxides such as acetyl and benzoyl peroxides, alkyl peroxides such as cumyl and t-butyl peroxides, hydroperoxides such as t-butyl and cumyl hydroperoxides, and peresters such as t-butyl perbenzoate, with t-butyl perbenzoate being a particularly preferred initiator. Other initiators which may be utilized, but are not preferred, include any of the various azo initiators such as 2,2'-azobisisobutyronitrile, disulfides, tetrazenes and other initiators known in the art.

The graft polymerization process of the invention is preferably carried out by contacting fine particle size polycarbonate with the alkyl (alkyl)methacrylate monomers which are to be grafted thereto, in the presence of a suitable free radical initiator and at a temperature sufficient to effectively activate the free radical initiator. A suitable method of preparing fine particles of polycarbonate is to utilize cryogenic grinding wherein the polycarbonate is cooled to cryogenic temperatures where it no longer exhibits plastic properties but instead becomes brittle and can be easily crushed or ground utilizing any of various commercially available size-reduction equipment such as vertical impact pulverizers and disintegrators. Various other conventional means can be employed for producing polycarbonates in fine particulate form. Particle size is important, but is not critical to the invention; however, smaller particle sizes are generally preferred and practical benefits in terms of utility as a compatibilizer are realized for average particle sizes below about 1 mm, with average polycarbonate particle sizes below 0.3 mm being preferred.

The graft copolymerization process can be adapted to be carried out in either a batch, semi-batch or continuous mode using any of various reactor designs including fluidized bed reactors, continuous stirred tank reactors, segmented continuous reactors, single or twin screw extruders or the like. The reaction is preferably carried out at or near atmospheric pressure, but pressure ranging from about 1 to 2000 psia can be employed. The reaction is preferably carried out in a closed reaction system to avoid loss of gaseous reactants and contamination of the environment. The reaction temperature depends primarily on the activation temperature of the initiator and the requirement for keeping the monomers predominately in the gaseous phase. Suitable reaction temperatures typically range from about 0° C. to about 300° C.

In order to control the number of monomer units or chain length of each of the poly(alkyl (alkyl)acrylate) grafts and to prevent crosslinking due to coupling of growing chains, a chain transfer agent such as mercaptosuccinic acid, thiomalic acid, methyl mercaptan, or the like can be utilized.

In the case of a batch reactor, it is desirable that the polycarbonate and optional chain transfer agent be added to the reactor fist and heated to the desired activation temperature of the initiator. Preferably, after the polycarbonate and the optional chain transfer agent have reached the activation temperature, the initiator and then the monomer are added to the reactor. The contents of the reactor are preferably subjected to continuous mixing or shear.

For continuous reactor systems, it is preferable that the initiator and monomer be introduced at a point wherein the polycarbonate and optional chain transfer agent is preheated to a suitable activation temperature for the initiator.

The amount of monomer, initiator, polymer and optional chain transfer agent used is dependent on the number of grafts desired, the amount of monomer to be incorporated into the graft copolymer and on the desired average number of monomer units per graft. The amount of monomer added to the reactor can range from about 1 to about 50 parts by weight, and more preferably from about 5 to about 25 parts by weight, per 100 parts by weight of polycarbonate. The amount of initiator utilized can range from about 1 to about 20 moles, and more preferably from about 3 to about 12 moles, per 100 moles of monomer. The amount of optional chain transfer agent can range up to about 5 moles and more desirably up to about 3 moles per 100 moles of monomer.

Although the process is designed to optimize graft copolymerization, some of the monomer can polymerize with itself to form a polyacrylate and some of the monomer will remain unreacted. The amount of monomer which is chemically incorporated into the graft copolymer is dependent on a number of different parameters and reaction conditions, such as the types and amounts of reactants, initiator and optional chain transfer agent used, as well as temperature and pressure. However, typical conversions based on the quantity of original monomer chemically incorporated into the graft copolymer are from about 50 to 75 percent. The graft copolymer products of the invention generally comprise from 1 to about 30 parts by weight, and more preferably from 2 to about 15 parts by weight, of poly(alkyl (alkyl)acrylate) grafts per 100 parts by weight of the polycarbonate portion of the graft copolymer. Any unreacted monomer or polyacrylate can be removed from the product mixture, if desired, by solvent extraction using, for example, a mixture of ethanol and distilled water. Reaction times for the process are generally substantially shorter than reaction times for conventional liquid phase graft polymerizations because of reduced mass transfer resistances with the solid-liquid-gas heterogeneous reaction system of the invention, with 65 percent conversion of monomer typically being completed within 15 minutes.

The polycarbonate-graft-poly(alkyl (alkyl)acrylate) copolymers of the invention can be used for generally any application wherein conventional polycarbonate compositions are employed but wherein enhanced impact resistance, scratch resistance and/or UV resistance would be desirable. The graft copolymers of the invention can be used alone or as the primary component of a thermoplastic composition including conventional amounts of convention fillers, reinforcing fibers, flame retardants and other additives. The most important application for the graft copolymers of the invention presently contemplated, however, is as a compatibilizing agent in polymeric blends comprising polycarbonate and poly(alkyl (alkyl)acrylates). Such blends may comprise from 1 to 300 parts, and more preferably from 10 to 150 parts of poly(alkyl (alkyl)acrylate) per 100 parts of polycarbonate and from 1 to 20 parts, and more preferably from 2 to 10 parts of a polycarbonate-graft-poly(alkyl (alkyl)acrylate) copolymer compatibilizer in accordance with the invention per 100 parts of polycarbonate. The foregoing polymer blends can be compounded with conventional amounts of conventional fillers, reinforcing fibers, flame retardants and other additives as desired to form a composition having improved impact resistance, scratch resistance and/or UV resistance.

Example

Chemical Reagents

Particulate polycarbonate was prepared by cryogenically grinding polycarbonate plastic to obtain an average particle size of approximately 48 Tyler mesh (0.295 mm). Methyl methacrylate containing 10 ppm hydroquinone inhibitor was utilized as the grafting monomer. The inhibitor was not removed prior to reaction because of its low concentration. The monomer was stored at 5° C. Tertiary-butyl peroxybenzoate (98 percent purity) was used as the free radical initiator; this was stored at 5° C. Mercaptosuccinic acid (97 percent purity) was used as a termination agent in polymerization to prevent crosslinking.

Reaction Procedure

The polycarbonate and a small amount of chain transfer agent was charged into a reactor. The temperature was preset to 138° C. and the contents of the reactor were subjected to continuous stirring. When the contents in the reactor reached the preset temperature, the free radical initiator followed by the monomer (methyl methacrylate) was added sequentially into the reactor. The reaction occurred at atmospheric pressure and was completed within 15 minutes. The product contained a multi-sized solid particle distribution.

While in accordance with the Patent Statutes, a preferred embodiment and best mode has been presented, the scope of the invention is not limited thereto, but rather is measured by the scope of the attached claims.

What is claimed is:

1. A method of grafting at least one alkyl (alkyl)acrylate monomer onto a polycarbonate comprising contacting a polycarbonate which is in the solid phase with an alkyl (alkyl)acrylate monomer which is in the gaseous phase in the presence of a suitable free radical initiator at a temperature sufficient to activate the free radical initiator for a time sufficient to achieve a desired degree of grafting onto the solid polycarbonate.

2. A method according to claim 1, wherein the polycarbonate is an aromatic polycarbonate and the alkyl (alkyl)acrylate monomer is an alkyl acrylate, an alkyl methacrylate, or a combination thereof, and wherein the alkyl portion of the alkyl acrylate or alkyl methacrylate monomer is a methyl or ethyl group.

3. A method according to claim 2, wherein the polycarbonate prior to grafting has a weight-average molecular weight in the range from about 5,000 to about 200,000, and wherein the amount of alkyl acrylate, alkyl methacrylate, or combination thereof is from about 1 to about 50 parts by weight per 100 parts by weight of polycarbonate.

4. A method according to claim 3, further comprising contacting the polyacrylate and alkyl (alkyl)acrylate with a suitable chain transfer agent for limiting the growth of grafted poly(alkyl(alkyl)acrylate) chains and inhibiting crosslinking between said chains.

5. A method according to claim 1, wherein the polycarbonate comprises recurring units of the formula

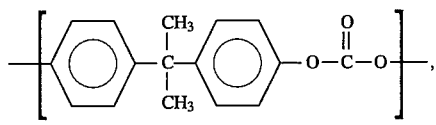

and wherein the alkyl (alkyl)acrylate monomer is methyl methacrylate which is grafted to the isopropylidene group of a recurring unit of the polycarbonate.

6. A method according to claim 5, wherein the polycarbonate prior to grafting has a weight-average molecular weight in the range from about 5,000 to about 200,000, and wherein the amount of methyl methacrylate is from about 1 to about 50 parts by weight per 100 parts by weight of polycarbonate.

7. A method according to claim 6, further comprising contacting the methyl methacrylate with a suitable chain transfer agent.

8. A method of grafting at least one alkyl (alkyl)acrylate monomer onto a polycarbonate at a carbon atom which both before and after grafting has an sp$^3$ electron configuration, comprising contacting a polycarbonate which is in the form of solid particles with from about 1 to about 50 parts by weight of alkyl (alkyl)acrylate monomer which is in the gaseous phase per 100 parts by weight of polycarbonate in the presence of a suitable free radical initiator at a temperature sufficient to activate the free radical initiator for a time sufficient to achieve a desired degree of grafting.

* * * * *